United States Patent [19]

Abe et al.

[11] Patent Number: 5,150,268
[45] Date of Patent: Sep. 22, 1992

[54] HEAD CLEANING DEVICE FOR DISK-TYPE DATA STORAGE UNIT

[75] Inventors: Nobuaki Abe; Yuichi Kurosawa, both of Tokyo, Japan

[73] Assignee: Asahi Kogaku Kogyo Kabushiki Kaisha, Tokyo, Japan

[21] Appl. No.: 647,222

[22] Filed: Jan. 29, 1991

[30] Foreign Application Priority Data

Feb. 2, 1990 [JP] Japan .................................. 2-22032

[51] Int. Cl.⁵ .............................................. G11B 5/41
[52] U.S. Cl. ..................................................... 360/128
[58] Field of Search ........................................ 360/128

[56] References Cited

U.S. PATENT DOCUMENTS

| | | | |
|---|---|---|---|
| 4,663,686 | 5/1987 | Freeman | 360/128 |
| 4,843,511 | 6/1989 | Downey | |
| 4,916,564 | 4/1990 | Fritsch | 360/128 |

FOREIGN PATENT DOCUMENTS

| | | |
|---|---|---|
| 61-195510 | 12/1986 | Japan . |
| 63-063118 | 3/1988 | Japan . |
| 2211014 | 6/1989 | United Kingdom . |
| 2232804 | 12/1990 | United Kingdom . |

Primary Examiner—A. J. Heinz
Attorney, Agent, or Firm—Sandler, Greenblum & Bernstein

[57] ABSTRACT

A head cleaning device for cleaning the read/write head of a disk-type data storage unit such as a floppy disk or diskette drive. The head cleaning device includes a cleaning disk for wiping the read/write head, and a jacket for storing the cleaning disk therein. The jacket has an opening for allowing the cleaning disk to contact the read/write head therethrough. The head cleaning device also has a mechanism for drivingly connecting the spindle of the data storage unit to the cleaning disk. The mechanism comprises a planetary gear mechanism having an eccentric sun gear disposed on a hub rotatably supported in the jacket, a ring gear coupled to the cleaning disk, a plurality of planet gears each meshing with the sun gear and the ring gear, and a member for preventing the planet gears from revolving around the sun gear. During operation, the cleaning disk rotates and wobbles radially while slidably contacting the read/write head so that the read/write head is wiped by the cleaning disk in a wide region thereof in varying directions.

9 Claims, 5 Drawing Sheets

HEAD CLEANING DEVICE FOR DISK-TYPE DATA STORAGE UNIT

The present disclosure relates to subject matter contained in Japanese Patent Application No. 2-22032 (filed on Feb. 2, 1990) which is expressly incorporated herein by reference in its entirety.

BACKGROUND OF THE INVENTION

1. Field of the Invention

The present invention relates to a head cleaning device for use with a disk-type data storage unit which includes a disk-shaped data storage medium and a read/write head for accessing the disk-shaped data storage medium.

2. Description of the Relevant Art

At present, various optical or magnetic disk-type data storage units are widely used with computers, word processors, electronic still cameras, and other information processing systems. The disk-type data storage units generally comprise a mechanism for rotating a disk-shaped data storage medium, a read/write head for writing data on and/or reading data from the disk-shaped data storage medium, and a mechanism for controlling the position of the read/write head with respect to the disk-shaped data storage medium.

The disk-type data storage units are classified into a contact-type data storage system such as a floppy disk drive in which the read/write head is held in physical contact with the data storage disk during read or write operations, and a non-contact-type data storage system such as a hard disk drive in which the read/write head is held out of physical contact with the data storage disk during such operations. In such a contact-type data storage system, the read/write head tends to get dirty and lose its function during usage over a long period of time.

One typical contact-type data storage system is a floppy disk drive. A diskette for use with the floppy disk drive comprises a flexible disk of plastic film coated on its surface with a mixture of a powdery magnetic material and a binder. While the diskette is in use, the surface of the coated layer of the mixture on the flexible disk is held in contact with and abraded by a magnetic read/write head, thereby producing the magnetic material powder. The magnetic powder is attached to and deposited on the read/write head, gradually reducing its reading and writing capabilities.

Although the magnetic heads in magnetic tape recorders may be also degraded in performance by magnetic tapes running in abrasive contact with the magnetic heads, they can easily be cleaned by the user because the magnetic heads are accessible to the user. However, the read/write heads of the floppy disk drives require a dedicated cleaning device because the user has no direct access to the read/write heads.

One conventional cleaning device for the read/write heads of floppy disk drives comprises a cleaning disk similar to a magnetic disk of an actual diskette which can be used in the floppy disk drives, and a jacket similar in shape and identical in dimensions to a jacket of the actual diskette. The cleaning disk is made of nonwoven fabric, for example, for wiping the read/write heads.

In use, the cleaning device is inserted into the slot of a floppy disk drive, the head of which is to be cleaned, in the same manner as an actual diskette. When the floppy disk drive is instructed to effect any one of its normal operations, it rotates the cleaning disk which wipes the read/write head that is held in contact with the surface of the cleaning disk. Since no data is recorded on and hence retrieved from, the cleaning disk, the floppy disk drive stops its operation after the elapse of a certain period of time. If the floppy disk drive is connected to a computer or a word processor, then the display of the computer or the word processor may display an error message indicating that the disk inserted in the floppy disk drive is inappropriate. The read/write head is cleaned by the cleaning disk during the time after the floppy disk drive has started operating and before it stops operating.

This conventional head cleaning device has several problems. Although as the floppy disk drive is in operation during the cleaning process the head may be moved radially with respect to the cleaning disk, the radial movement of the head usually does not exceed one reciprocating movement in a single cleaning cycle, and does not produce a substantial cleaning effect. Actually, a cleaning effect is mostly obtained when the read/write head is wiped in a certain constant direction by a limited region on the cleaning disk, which corresponds to one particular track on an actual diskette that is accessed by the head during normal operation of the floppy disk drive.

The constant direction in which the head is wiped by the cleaning disk is the same as the direction in which the surface of a magnetic disk of any actual diskette slides on the head, i.e., a direction tangential to the track where the head and the magnetic disk contact each other.

The fact that the head is wiped by only the limited region on the cleaning disk results in a relatively short period of time for which the cleaning disk and hence the cleaning device can be used. Therefore, the cost for use of such cleaning device is relatively expensive. Further, the head is not effectively cleaned by the cleaning disk which wipes the head in the constant direction. Specifically, the head usually has a gap defined in its contact surface with diskettes for efficiently magnetically reading or writing data. In most cases, the gap extends in a direction normal to the direction tangential to a track which is contacted by the head. Any powdery deposit of magnetic material which is trapped in the gap cannot sufficiently be removed by the cleaning disk which wipes the head in the constant direction, i.e., the direction normal to the direction in which the gap extends.

SUMMARY OF THE INVENTION

It is therefore an object of the present invention to provide an improved device for cleaning the read/write head of a disk-type data storage unit.

Another object of the present invention is to provide an improved device, which is less costly, for cleaning the read/write head of a disk-type data storage unit.

Still another object of the present invention is to provide an improved device for more effectively cleaning the read/write head of a disk-type data storage unit.

According to the present invention, there is provided a head cleaning device for use with a data storage unit having a drive member for rotating a data storage disk and a read/write head for accessing the data storage disk. The head cleaning device comprises a cleaning disk for wiping the read/write head of the data storage unit, and a jacket for storing the cleaning disk therein. The jacket has an opening for allowing the cleaning disk to contact the read/write head therethrough. The head cleaning device also has a connecting device for drivingly connecting the drive member of the data storage unit to the cleaning disk. The connecting device has a first end operatively and detachably connectable to the drive member of the data storage unit and a second end operatively connected to the cleaning disk. The connecting device is responsive to rotative drive power from the drive member of the data storage unit, for rotating the cleaning disk about its own axis and moving the axis of the cleaning disk with respect to the jacket.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
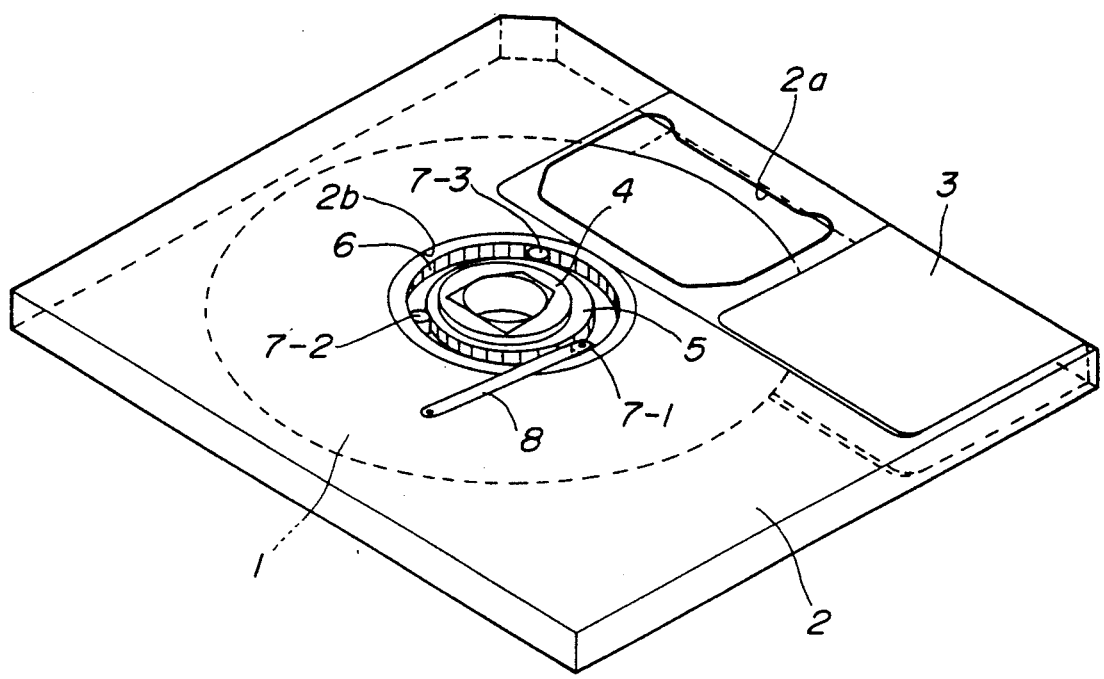
FIG. 1 is a perspective view of a head cleaning device according to a preferred embodiment of the present invention.

FIG. 1 shows a head cleaning device according to a preferred embodiment of the present invention. The head cleaning device shown in FIG. 1 is designed for use with one type of floppy disk drives which are in wide use today, and serves to clean the read/write head of such a floppy disk drive.

The floppy disk drive is of a general construction which comprises a spindle or drive member (not shown) for rotating a magnetic data storage disk, known as a floppy disk or diskette, and a read/write head H (FIGS. 3 and 4) for accessing the disk. The head cleaning device includes a cleaning disk 1 for wiping the head H of the disk drive, and a jacket 2 storing the cleaning disk 1 therein. The cleaning disk 1 is made of the nonwoven fabric or any of various other materials suitable for wiping the head H. The cleaning disk 1 wipes a surface Ha (FIG. 4) of the head H which is in contact with the magnetic disk of any actual diskette in normal operation, and removes dust or dirt which may have been attached to or deposited on the head surface Ha. The dust or dirt may be powder of a magnetic material which is produced when a magnetic layer on the magnetic disk of the actual diskette is abraded by the head H while the magnetic disk is being accessed by the head H. The jacket 2 is similar in shape and identical in dimensions to a jacket for the magnetic disk of an actual diskette. In use, the head cleaning device can be inserted into the floppy disk drive in the same manner as an actual diskette. The jacket 2 stores the cleaning disk 1 therein and has openings or slots 2a in respective opposite panels thereof for allowing contact between the cleaning disk 1 and the head H.

The jacket 2 has a slidable shutter 3 on one of its side edges, for closing the slots 2a. The slidable shutter 3 is normally urged to close the slots 2a under the bias of a spring (not shown). When the head cleaning device is inserted in the floppy disk drive, the shutter 3 is moved by a shutter opening mechanism in the floppy disk drive to open the slots 2a, thus allowing the cleaning disk 1 to acceses and contact the head H through the slots 2a. The shutter 3 and its associated parts are the same as those of an actual diskette.

The jacket 2 has a circular central hole 2b defined in one of the opposite panels, and a hub 4 disposed in the hole 2b. The hub 4 is somewhat loosely fitted in the hole 2b so that it can jiggle radially, and is rotatably supported in the jacket 2, in the same manner as with an actual diskette. The hub 4 has an outer circumferential surface which is also of the same configuration as that of an actual diskette. Therefore, the hub 4 can detachably be coupled to, and can be driven by, the spindle of the floppy disk drive. Note that unlike a hub of an actual diskette, which is fixed directly to the magnetic disk, the hub 4 is not fixed directly to the cleaning disk 1.

Figure 2:
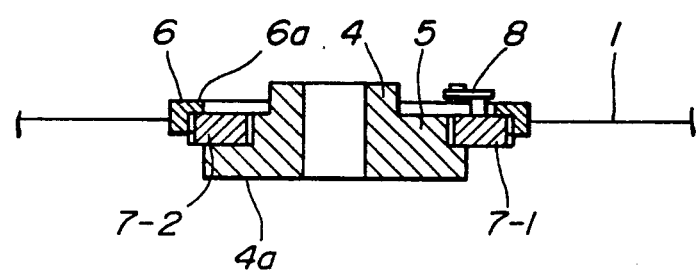
FIG. 2 is an sectional side elevational view of a planetary gear mechanism in the head cleaning device shown in FIG. 1.

As shown in FIG. 2, the hub 4 and the cleaning disk 1 are connected to each other by a planetary gear mechanism. When the head cleaning device is in use, the spindle of the floppy disk drive is drivingly connected to the cleaning disk 1 through the hub 4 and the planetary gear machanism. The planetary gear mechanism comprises a sun gear 5 disposed on the hub 4 eccentrically with respect to the central axis of the hub 4, a ring gear 6 fixed to the cleaning disk 1 coaxially with the cleaning disk 1, and three planet gears 7-1, 7-2, 7-3 disposed between and meshing with the sun gear 5 and the ring gear 6. The planet gears 7-1, 7-2, 7-3 are sandwiched between and axially supported by an outer flange 4a of the hub 4 and an inner flange 6a of the ring gear 6. One of the planet gears 7-1 is coupled to an inner surface of the jacket 2 through a link 8. The link 8 has one end swingably connected to the inner surface of the jacket 2, and the planet gear 7-1 is rotatably held against the other end of the link 8. The planet gear 7-1 is allowed to move in the direction generally radial with respect to the hub 4, in response to rotation of the sun gear 5 about the axis of the hub 4, but is prevented from revolving around the axis of the hub 4.

The disk cleaning device operates as follows: In use, the head cleaning device is inserted into the slot of the floppy disk drive in the same manner as any actual diskette or floppy disk. When the head cleaning device is placed in the flopppy disk drive, the shutter 3 is moved by the shutter opening mechanism in the floppy disk drive to open the slots 2a, through which the surface Ha of the read/write head H is contacted by the surface of the cleaning disk 1. At the same time, the spindle of the floppy disk drive is copuled to the hub 4.

Then, when the floppy disk drive is instructed to carry out any one of its normal operations, the spindle rotates the hub 4. The rotative drive power from the spindle is transmitted to the planetary gear mechanism which causes the cleaning disk 1 to produce a certain movement depending on the geometry of the planetary gear mechanism. The cleaning disk 1 now wipes the surface Ha of the rear/write head H. The hub 4 and the planetary gear mechanism jointly provide connecting means for drivingly connecting the spindle to the cleaning disk 1. The connecting means has a first end operatively and detechably connectable to the spindle in the floppy disk drive and a second end operatively connected to the cleaning disk 1, and produces a movement of the cleaning disk 1 in response to the rotative drive power from the spindle.

When the hub 4 is rotated, the sun gear 5 rotates about eccentrically with respect to the hub 4. In response to the rotation of the sun gear 5, the planet gears 7-1, 7-2, 7-3 rotate about their own respective axes and also cyclically move radially inwardly and outwardly with respect to the hub 4 because of the link 8 connecting the planet gear 7-1 to the jacket 2. The ring gear 6 and hence the cleanig disk 1 fixed thereto rotate about their own axis, which revolves around the axis of the hub 4.

Figure 3:
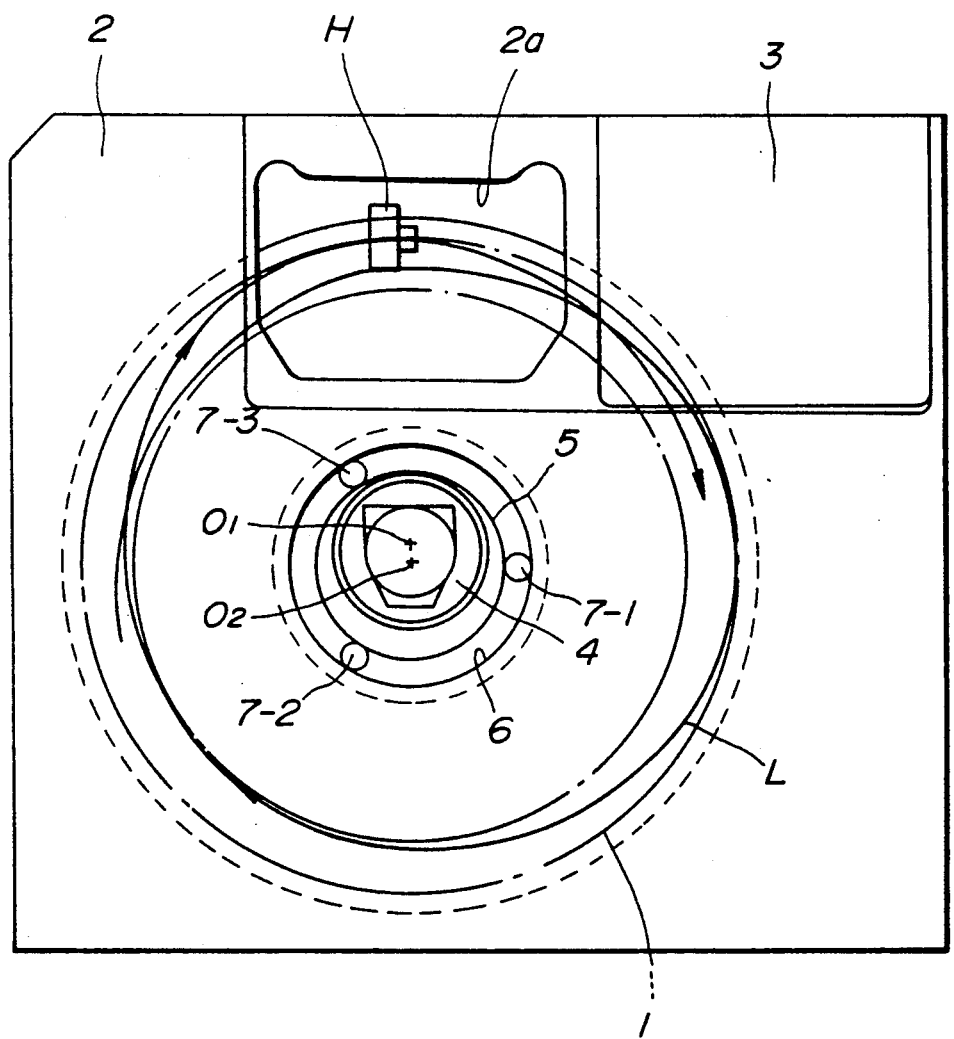
FIG. 3 is a plan view of the head cleaning device shown in FIG. 1.
Figure 4:
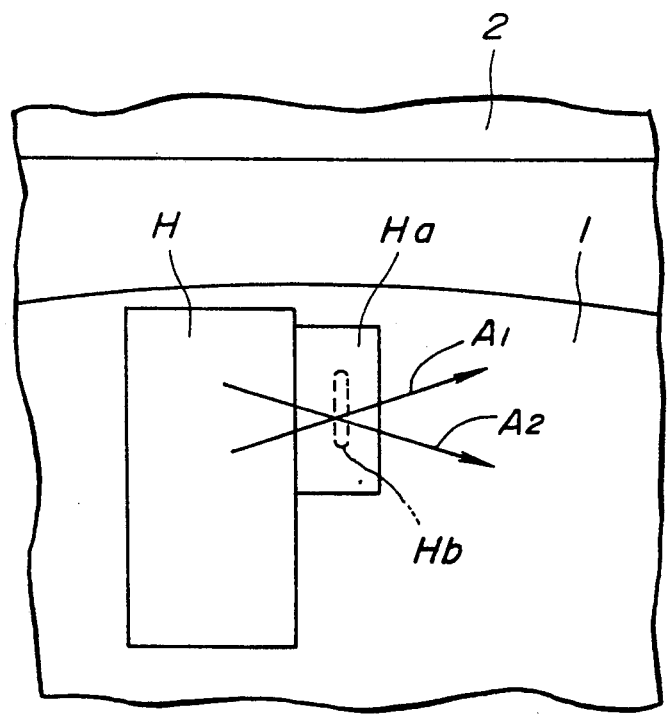
FIG. 4 is an enlarged fragmentary view of FIG. 3.

The movement of the cleaning disk 1, which is produced by the planetary gear mechanism, is shwon in FIG. 3. According to this movement, the cleaing disk 1 rotates about its own axis 02, and the axis 02 revolves around the axis 01 of the hub 4, so that the cleaning disk 1 cyclically moves with respect to the jacket 2. FIG. 3 shows the relative movement of the read/write head H with respect to the cleaning disk 1, and hence the path of a point where the read/write head H contacts the cleaning disk 1, the path being indicated by the line L.

As indicated by the path L, the cleaning disk 1 contacts the read/write head H in an annular region defined between two radailly spaced circles represented by dot-and-dash lines. The annular region shown in FIG. 3 is wider than the region corresponding to a single track; in such a region the cleaning disk of a typical conventional head cleaning device is contacted by the read/write head as described above. The wider contact region is effective to extend the service life of the cleaning disk device. The direction in which the read/write head H is wiped by the cleaning disk 1 is not constant, but varies in an angular range between the directions indicated by the arrows A1, A2 shown in FIG. 4, as the cleaning disk 1 cyclically moves radially with respect to the jacket 2. Accordingly, the read/write head H is cleaned more effectively than would be if the direction in which the read/write head H is wiped by the cleaning disk 1 were constant. In the case where the surface Ha of the read/write head H has a narrow gap Hb extending perpendicularly to the magnetic tracks on a floppy disk or diskette, the read/write head H is wiped by the cleaning disk 1 in varying directions oblique to the gap Hb. Therefore, dust deposits in the gap Hb can be removed more effectively by the cleaning disk 1 of the invention.

Since no data is retrieved from the cleaning disk 1, the floppy disk drive stops operating a certain period of time after it has started to operate. After the floppy disk drive has started to operate, and until it stops operating, the read/write head H is cleaned by the cleaning disk 1.

Figure 5:
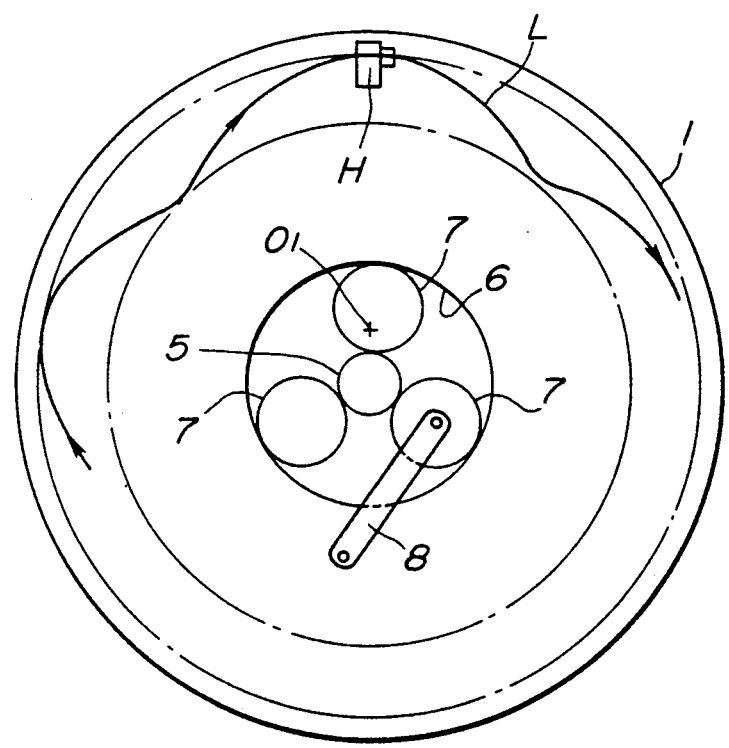
FIG. 5 is a plan view of another planetary gear mechanism which can be used in the head cleaning device.
Figure 6:
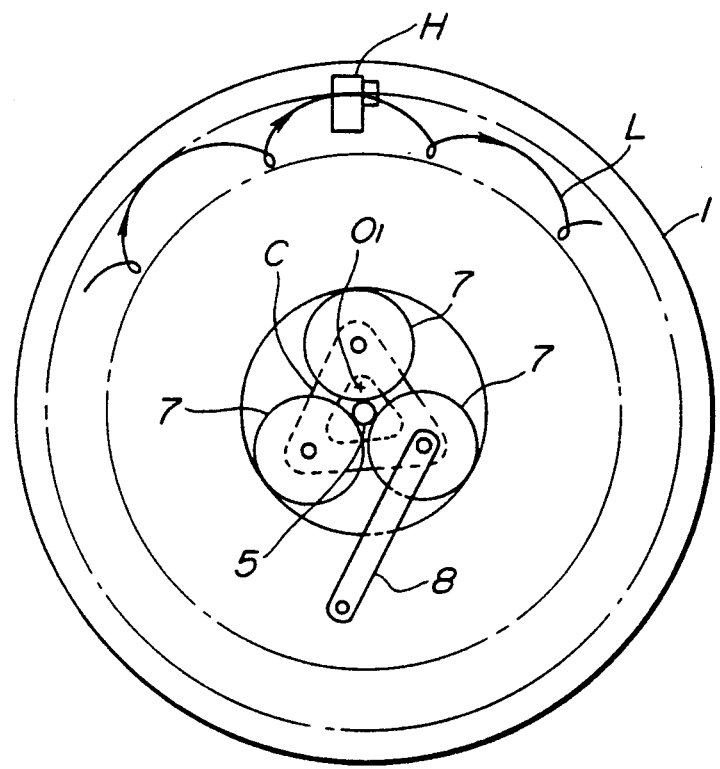
FIG. 6 is a plan view of still another planetary gear mechanism which can be used in the head cleaning device.

As described above, the movement of the cleaning disk 1 is determined depending on the geometry of the planetary gear mechanism. FIGS. 5 and 6 schematically show two other planetary gear mechanisms having different geometries, which can be used in the head cleaning device according to the present invention. Each of FIGS. 5 and 6 shows a cleaning disk 1, pitch circles of an eccentric sun gear 5, a ring gear 6, and planet gears 7 of a planetary gear mechanism, a link 8, a read/write head H, a path L followed by a point where the read/write head H and the cleaning disk 1 contact each other, and an axis 01 of a hub. The hub shown in FIGS. 5 and 6 is different from the hub 4 accordiing to the previous embodiment in that the hub has a blind central hole so that it does not physically interfere with the sun gear 5.

With the planetary gear mechanism shown in FIG. 5, the sun gear 5 is smaller in diameter and displaced more eccentrically than the sun gear 5 shown in FIG. 3. Therefore, the direction in which the read/write head H is wiped by the cleaning disk 1 varies in a greater angular range.

The planetary gear mechanism shown in FIG. 6 has a sun gear of very small diameter and three planet gears 7 rotatably supported on a carriage C. The carriage C is connected to a jacket (not shown) through a link 8 such that the planet gears 7 are prevented from revolving around the axis 01 of the hub. With this arrangement, the path L of a point where the read/write head H and the cleaning disk 1 contact each other follows sharper curves such that the read/write head H is wiped by the cleaning disk 1 in every direction. The geometry of the planetary gear mechanism shown in FIG. 6 is suitable for cleaning a read/write head H which has a gap of relatively complex configuration.

Altough certain preferred embodiments have been shown and described, it should be understood that many changes and modifications may be made therein without departing from the scope of the appended claims.

We claim:

1. A head cleaning device for use with a data storage unit having a drive member for rotating a data storage disk and read/write head for accessing the data storage disk, said head cleaning device comprising:
    a) a cleaning disk for wiping said read/write head of said data storage unit;
    b) a jacket storing said cleaning disk;
    c) said jacket having an opening for allowing said cleaning disk to contact said read/write head through said opening;
    d) connecting means for drivingly connecting the drive member of said data storage unit to said cleaning disk; and
    e) said connecting means comprising a first end operatively and detachably connectable to the drive member of said data storage unit and a second end operatively connected to said cleaning disk, and being responsive to rotative drive power from the drive member of said data storage unit, said connecting means comprising means for rotating said cleaning disk about its own axis and moving said axis of said cleaning disk with respect to said jacket.

2. A head cleaning device according to claim 1, wherein said connecting means comprises movement producing means for producing a movement of said cleaning disk such that said cleaning disk rotates about its own axis and said axis of said cleaning disk revolves about another axis.

3. A head cleaning device according to claim 2, wherein said movement producing means comprises a planetary gear mechanism.

4. A head cleaning device 3, wherein said connecting means includes a hub rotatably supported in said jacket, said planetary gear mechanism comprising a sun gear disposed on said hub eccentrically with respect to an axis of said hub, a ring gear coupled to said cleaning disk, a plurality of planet gears each meshing with said sun gear and said ring gear, and means for preventing said planet gears from revolving around said sun gear.

5. A head cleaning device for cleaning a read/write head of a disk data storage unit, comprising:
- a rotatable cleaner for slidably contacting the read/write head; and
- means for rotating said cleaner about an axis while translating said axis in a direction generally transverse to said axis.

6. A head cleaning device according to claim 5, wherein said rotating means is rotatable about another axis for rotating said cleaner and comprises means for revolving said axis about said other axis.

7. A head cleaning device according to claim 6, wherein said cleaner has a member for receiving rotative drive power, said mechanism comprising a sun gear disposed eccentrically with respect to said member of said cleaner, a ring gear connected to said cleaner, a plurality of planet gears meshing with said sun gear and said ring gear, and means, on at least one of said planet gears, for preventing said planet gears from revolving around said sun gear.

8. A device for cleaning a read/write head of a data storage unit, said device comprising:
- a rotatable cleaning disk for wiping the read/write head; and
- means for rotating said cleaning disk about a first axis and for translating said first axis about a second axis spaced from said first axis.

9. A device according to claim 8, wherein said rotating and translating means comprises a planetary gear mechanism.

* * * * *